(12) United States Patent
Manassen et al.

(10) Patent No.: US 8,063,463 B2
(45) Date of Patent: *Nov. 22, 2011

(54) SOLID STATE IMAGE WAVELENGTH CONVERTER

(75) Inventors: Amnon Manassen, Haifa (IL); Giora Yahav, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 380 days.

This patent is subject to a terminal disclaimer.

(21) Appl. No.: 11/716,603

(22) Filed: Mar. 12, 2007

(65) Prior Publication Data

US 2007/0273770 A1    Nov. 29, 2007

Related U.S. Application Data

(62) Division of application No. 10/048,962, filed as application No. PCT/IL99/00513 on Sep. 26, 1999, now Pat. No. 7,196,390.

(51) Int. Cl.
*H01L 31/107* (2006.01)

(52) U.S. Cl. ............... 257/438; 257/458; 257/E31.063; 359/248; 348/222.1

(58) Field of Classification Search .................. 257/438
See application file for complete search history.

(56) References Cited

U.S. PATENT DOCUMENTS

| 4,476,477 A | 10/1984 | Capasso et al. |
| 4,525,687 A | 6/1985 | Chemla et al. |
| 4,686,550 A | 8/1987 | Capasso et al. |
| 4,884,119 A | 11/1989 | Miller |
| 5,101,293 A | 3/1992 | Kemeny |

(Continued)

FOREIGN PATENT DOCUMENTS

EP    0394674    10/1990

(Continued)

OTHER PUBLICATIONS

Brum et al. "Electric-Field-Induced Dissociation of Excitons in Semiconductor Quantum Wells", Physical Review B, 31(6): 3893-3898, 1985. Abstract.

(Continued)

*Primary Examiner* — Jerome Jackson, Jr.
(74) *Attorney, Agent, or Firm* — Vierra Magen Marcus & DeNiro LLP

(57) ABSTRACT

A method for encoding information that is encoded in spatial variations of the intensity of light characterized by a first wavelength in light characterized by a second wavelength, the method comprising: transmitting the first wavelength light through a photo-conducting material in which electron-hole pairs are generated by absorbing photons from the first wavelength light to generate a first density distribution of electrons homologous with the spatial variations in intensity of the first wavelength light; trapping electrons from the first electron density distributions in a trapping region to generate an electric field homologous with the density distribution in a material that modulates a characteristic of light that passes therethrough responsive to an electric field therein; transmitting a pulse of light having sufficient energy to generate electron-hole pairs in the photo-conducting material through the modulating material and thereafter through the photo-conducting layer to generate a second additional electron density homologous with the first electron density distribution; trapping electrons from the second electron density distribution in the trapping region; and transmitting the second wavelength light through the modulating material thereby modulating the second wavelength light in response to the electric field and encoding it with the information.

21 Claims, 7 Drawing Sheets

U.S. PATENT DOCUMENTS

| | | | |
|---|---|---|---|
| 5,124,545 | A | 6/1992 | Takanashi et al. |
| 5,307,200 | A | 4/1994 | Yoshida |
| 5,453,860 | A | 9/1995 | Akiyama et al. |
| 5,504,365 | A | 4/1996 | Yamazaki et al. |
| 6,025,950 | A | 2/2000 | Tayebati et al. |
| 6,445,839 | B1 * | 9/2002 | Miller ............................ 385/17 |
| 7,196,390 | B1 | 3/2007 | Manassen et al. |

FOREIGN PATENT DOCUMENTS

| | | |
|---|---|---|
| EP | 0494086 | 7/1992 |
| WO | WO 97/01111 | 1/1997 |
| WO | WO 97/01112 | 1/1997 |
| WO | WO 97/01113 | 1/1997 |
| WO | WO 99/40478 | 8/1999 |

OTHER PUBLICATIONS

Miller et al. "Band-Edge Electroabsorption in Quantum Well Structures: The Quantum-Confined Stark Effect", Physical Review Letters, 53(22): 2173-2176, 1984.

Miller et al. "Electric Field Dependence of Optical Absorption Near the Band Gap of Quantum-Well Structures", Physical Review B, 32(2): 1043-1060, 1985.

Ripamonti et al. "Realization of A Staircase Photodiode: Towards A Solid State Photomultiplier", Nuclear Instruments and Methods in Physics Research Section A, 288(1): 99-103, 1990.

Wood et al. "131 PS Optical Modulation in Semiconductor Multiple Quantum Wells (MQW's)", IEEE Journal of Quantum Electronics, 21(2): 117-118, 1988.

Wood et al. "High-Speed Optical Modulation With GaAs/GaA1As Quantum Wells in A P-I-N. Diode Structure", Applied Physical Letters, 44(1): 16-18, 1984.

Japanese Office action dated Mar. 25, 2010, Japanese Patent Appl. 2001-526651.

English Translation of Claims in Response to Japanese Office Action dated Oct. 4, 2010, Japanese Patent Application No. 2001-526651.

Response to Office Action dated Apr. 15, 2011, Japanese Patent Application No. 2001-526651.

English translation of Claims now on file in Japanese Patent Application No. 2001-526651.

Japanese Office Action dated Feb. 3, 2011, Japanese Patent Office, Japanese Patent Application No. 2001-526651.

* cited by examiner

US 8,063,463 B2

SOLID STATE IMAGE WAVELENGTH CONVERTER

RELATED APPLICATIONS

This Application is a Divisional Application of U.S. patent application Ser. No. 10/048,962 filed Feb. 1, 2002, issued as U.S. Pat. No. 7,196,390 on Mar. 27, 2007, which is the National Phase of International PCT Patent Application No. PCT/IL99/00513, filed Sep. 26, 1999, the contents of both of which are incorporated herein by reference.

FIELD OF THE INVENTION

The invention relates to solid state wavelength converters used for encoding light characterized by a first wavelength with data encoded in light characterized by a second wavelength and in particular to encoding the light when the data represents an image.

BACKGROUND OF THE INVENTION

Solid state wavelength converters that convert an image encoded in the intensity of light characterized by a first wavelength to the image encoded in light characterized by a second wavelength are known in the art. The light characterized by the first and second wavelengths is hereinafter referred to as "input light" and "output light" respectively and for clarity and simplicity of presentation it is assumed that the encoded image is an image of an object.

One type of wavelength converter comprises a layered body comprising a plurality of thin contiguous layers formed from optically and/or electrically active materials. One of the layers is a photo-conducting layer and one of the layers is a photo-modulating layer. Material in the photo-conducting layer absorbs energy from light that passes through the photo-conducting layer and converts the absorbed energy to electron-hole pairs. Material in the photo-modulating layer modulates a characteristic, generally intensity, of light that passes through the photo-modulating layer by an amount that depends upon the strength of an electric field in the modulating layer. Generally, the outermost layers in the layered body are formed from a transparent conducting material and function as electrodes. An appropriate electrical power supply is connected to the electrodes.

When the wavelength converter is in operation, the power supply applies a potential difference between the electrodes and generates thereby an electric field in the layers. Light, i.e. input light, from an object to be imaged is focused onto the photo-conducting layer. In the photo-conducting layer the input light has a spatially varying intensity corresponding to the image of the object. Photons in input light are absorbed in the photo-conducting layer and generate electron-hole pairs in the layer. The number of electron-hole pairs produced in a region of the photo-conducting layer is substantially proportional to the intensity of the input light in the region. Thus, the varying intensity pattern, hereinafter referred to as an "input image", of the input light in the photo-conducting layer is "copied" into the density distribution of the generated electron-hole pairs.

Under the influence of the electric field generated by the power supply, the electrons from the electron-hole pairs drift in the direction of the photo-modulation layer and are trapped near to or on a surface of the photo-modulation layer. The trapped electrons generate an electric field, hereinafter referred to as a "modulation field", in the photo-modulation layer. Since the density distribution of electron-hole pairs generated in the photo-conducting layer images the object, the trapped electron density distribution, hereinafter referred to as a "charge image", and the magnitude of the modulation field generated by the trapped electrons also image the object.

After exposure to the input light, the converter is exposed to light, i.e. output light, radiated from an appropriate light source. The output light is caused to be incident on the wavelength converter and exits the wavelength converter after passing through the photo-modulation layer. The photo-modulation layer modulates the output light responsive to the magnitude of the modulation field. Output light that passes through a region of the modulation layer in which the modulation field is strong is strongly modulated. Output light that passes through a region of the modulation layer in which the modulation field is weak is weakly modulated. Therefore, upon exiting the converter, the output light is coded with the image of the object, i.e. the input image of the object is copied into the output light, and the output light may thereafter be processed to provide an image of the object.

U.S. Pat. No. 5,124,545 to Takanashi et. al. describes a number of different wavelength converters of this type. One wavelength converter described in the patent comprises a photo-conducting layer formed, for example from Cadmium Sulfide (CdS) or Bismuth Silicon Oxide ($B_{12}SiO_{20}$), that is contiguous with a photo-modulation layer, "such as a single crystal of lithium-niobate or a nematic liquid crystal". Both the input light and the output light pass through both layers. The energy of photons in the output light is therefore chosen to be less than the band-gap energy of the photo-conducting layer. This prevents the output light from generating electron-hole pairs in the photo-conducting layer that would destroy correspondence between an input image of an object being imaged with the wavelength converter and a charge image of the object in the wavelength converter that generates a modulation field. As a result, a prior art wavelength converter of this type is generally used when energy of photons in the input light is greater than energy of photons in the output light. A wavelength converter of this type would be practical for converting a UV input image of an object to an "output" image of the object in the visible spectrum, but not for converting an IR input image of the object to a visible output image of the object.

Another wavelength converter described in the patent comprises a dielectric mirror or a "light insulating film" sandwiched between a photo-conducting layer and a photo-modulation layer. In this wavelength converter, output light is incident on and passes through the photo-modulation layer and is then reflected by the dielectric mirror to pass through the photo-modulation layer a second time and exit the wavelength converter. As a result of the mirror, the output light never reaches the photo-conducting layer and therefore does not affect a charge image of an object being imaged with the converter. A wavelength converter of this type can therefore convert an image encoded in a relatively "low energy" input light to an image encoded in a relatively "high energy" output light, e.g. an IR image to a visible light image.

However, in wavelength converters with a mirror, the presence of the mirror tends to increase the distance between a charge image formed in the wavelength converter and the wavelength converter's photo-modulation layer. In addition it tends to increase the distance, in a direction perpendicular to the plane of the photo-modulation layer, over which the charge image is distributed. Both these effects of the mirror tend to blur or reduce sharpness with which a modulation field generated by a charge image corresponds to an input image of an object being imaged. Therefore, the mirror tends to reduce the spatial resolution of the wavelength converter.

In many prior art wavelength converters, for practical intensities of input light, variations in the density of trapped electrons are often too small to affect acceptable modulation of output light. As a result, the sensitivity of these wavelength converters is not sufficient for many applications. It would be advantageous to have wavelength converters with increased sensitivity.

SUMMARY OF THE INVENTION

An aspect of the invention relates to providing a solid state wavelength converter having improved sensitivity so that output light from the wavelength converter is useable to provide relatively high-resolution images of an object when intensity of input light from the object is relatively low.

A wavelength converter in accordance with a preferred embodiment of the present invention comprises an electron multiplication region located between a photo-conducting layer and a photo-modulation layer. Preferably, the multiplication region comprises layers of semiconductor material that form a graded-band-gap staircase-multiplier. Graded-band-gap staircase-multipliers are described in U.S. Pat. No. 4,476,477 to Capasso et. al. and in an article entitled "Realization of a Staircase Photodiode: Towards a Solid State Photomultiplier", by Ripamonti et al, in Nuclear Instruments and Methods in Physics Research, A288 (1990) pp 99-103, the disclosures of which are incorporated herein by reference.

Electrons from electron-hole pairs, generated in the photo-conducting layer by input light incident on the converter from an object being imaged, drift through the multiplication region on their way to the photo-modulation layer. The drifting electrons ionize material in the multiplication region and multiply in an avalanche process. As a result, the number of electrons that reach the photo-modulation layer is substantially increased over the number that would reach the photo-modulation layer in the absence of the multiplication region. The sensitivity of the wavelength converter is therefore substantially increased over that of prior art wavelength converters.

An aspect of some preferred embodiments of the present invention relates to providing a wavelength converter in which input light photons have lower energy than output light photons and the output light passes through both the photo-conducting and photo-modulation layers of the converter. Such a wavelength converter can, for example, convert an IR input image of an object into a visible image of the object without the need to provide a mirror between the photo-conducting layer and the photo-modulation layer. As a result, the resolution of the visible image is not degraded by distortions, described above, that a mirror causes in a modulation field generated in the wavelength converter responsive to the IR input image.

However, when the output light passes through the photo-conducting layer of the wavelength converter it generates electron-hole pairs in the photo-conducting layer. Electrons from the electron-hole pairs, as noted above, drift to the photo-modulation layer and may destroy correspondence between an input image and a charge image generated in the converter responsive to the input image. As a result, the modulation field in the modulation layer is distorted and once distorted cannot be used to accurately encode output light with the image of the object.

An aspect of some preferred embodiments of the present invention relates to preventing electrons formed in the photo-conducting layer by passage of output light through the photo-conducting layer from destroying correlation between modulation of output light and an input image of an object that is encoded in input light.

In some preferred embodiments of the present invention, the output light passes through the photo-conducting layer before it passes through the photo-modulation layer.

In some preferred embodiments of the present invention, the absorption coefficient of the photo-modulation layer increases with increasing electric field in the photo-modulation layer. Therefore, a pattern of spatial modulation of the output light is a "negative image" of the spatial modulation of the input light. Where the intensity of input light is relatively strong, the intensity of output light is relatively weak and an image of the object formed with modulated output light is a negative image of the object. A photo-modulation layer for which the absorption coefficient increases with increase in electric field is hereinafter referred to as a "negative image modulator".

In both of these preferred embodiments, an electron density in the photo-conducting layer generated from electron-hole pairs produced by the passage of output light through the photo-modulation layer, is not homologous with the input image. The electrons from the non-homologous electron density drift to the photo-modulation layer and destroy correspondence between the input image and a modulation field in the photo-modulation layer.

In order to prevent the lack of correspondence between the modulation field and the input image from affecting modulation of the output light, in accordance with a preferred embodiment of the present invention, output light that illuminates the converter is provided in the form of short pulses of light. The pulse width of a pulse of output light is so short that the pulse substantially completely traverses the photo-modulation layer of the converter before electrons generated by the pulse in the photo-conducting layer reach the photo-modulation layer and affect a modulation field in the photo-modulation layer. Therefore, when a charge image is generated in the wavelength converter by input light from an object, output light that subsequently illuminates the converter is substantially accurately modulated in accordance with the charge image. Modulation of the output light pulse is substantially unaffected by passage of the output light pulse through the wavelength converter even though, in passing through the photo-conducting layer, the output light pulse produces electron-hole pairs in the photo-conducting layer.

While modulation of the output light pulse is not affected by passage through the photo-conducting layer, the light in the output light pulse is partly absorbed in the photo-conducting layer. Therefore, in accordance with a preferred embodiment of the present invention, output light is provided with sufficient intensity to compensate for absorption in the photo-conducting layer.

In some preferred embodiments of the present invention, the absorption coefficient of the photo-modulation layer decreases with increasing electric field in the photo-modulation layer. In these preferred embodiments, a pattern of spatial modulation of output light is a positive image of the spatial modulation of input light. Where the intensity of input light is relatively strong the intensity of output light is also relatively strong and an image of the object formed with modulated output light is a positive image of the object. A photo-modulation layer for which the absorption coefficient decreases with increase in electric field is hereinafter referred to as a "positive image modulator".

In some preferred embodiments of the present invention, in which the photo-modulation layer is a positive image modulator, the output light passes through the photo-modulation layer before it passes through the photo-conducting layer. In these preferred embodiments of the present invention, an electron density in the photo-conducting layer that is generated from electron-hole pairs produced by the passage of output light through the photo-modulation layer is homologous with the input image. Electrons from this electron density that drift to the photo-modulation layer do not destroy correspondence between the input image and a modulation field in the photo-modulation layer. Instead, the electrons amplify the modulation field while maintaining the correspondence between the modulation field and the input image.

According to an aspect of some preferred embodiments of the present invention, output light is used to amplify a modulation field that modulates output light.

In some preferred embodiments of the present invention, in which the photo-modulation layer is a positive image modulator and output light passes through the photo-modulation layer before passing through the photo-conducting layer, a first pulse of output light is used to amplify a modulation field for a second, subsequent, pulse of output light. In some preferred embodiments of the present invention an output light pulse that passes through a wavelength converter has a pulse length sufficiently long so that electrons generated by the passage of the light pulse through the photo-conducting layer amplify the modulating field before the light pulse has left the photo-modulation layer. As a result, the output light pulse is modulated by an amplified modulating field that it itself has amplified.

An aspect of some preferred embodiments of the present invention relates to providing a wavelength converter comprising a shutter. The shutter is grown on one of the conducting layers of the wavelength converter using methods known in the art. In some wavelength converters, in accordance with a preferred embodiment of the present invention, the shutter is used to shutter input light. In some wavelength converters, in accordance with a preferred embodiment of the present invention the shutter is used to shutter output light. In some wavelength converters, in accordance with a preferred embodiment of the present invention, the wavelength converter comprises two shutters. One of the shutters is used to shutter input light and one of the shutters is used to shutter output light. In a preferred embodiment of the present invention a shutter is grown on one or both of the two conducting layers of the wavelength converter.

An aspect of some preferred embodiments of the present invention relates to providing a camera comprising a wavelength converter, in accordance with a preferred embodiment of the present invention. The camera collects light characterized by a first wavelength from an object being imaged and images the object on an appropriate photosensitive surface, such as a CCD, with light characterized by a second wavelength. The light characterized by the first wavelength is input light of the wavelength converter and the light characterized by the second wavelength is output light of the wavelength converter. In some preferred embodiments of the present invention the camera is a 3D camera used to measure distances to objects in a scene imaged with the camera.

There is therefore provided in accordance with a preferred embodiment of the present invention a method for encoding information that is encoded in spatial variations of the intensity of light characterized by a first wavelength in light characterized by a second wavelength, the method comprising: generating a first density distribution of electrons homologous with the spatial variations in intensity of the first wavelength light; generating a second additional electron density homologous with the first electron density distribution; trapping electrons from the first and second electron density distributions in a trapping region to generate an electric field homologous with the density distributions in a material that modulates a characteristic of light that passes therethrough responsive to an electric field therein; and transmitting the second wavelength light through the modulating material thereby modulating the second wavelength light in response to the electric field and encoding it with the information.

Preferably, generating the second additional electron density comprises passing electrons from the first density distribution through a structure comprising a plurality of graded-band-gap layers in which electrons are multiplied in an avalanche process.

Alternatively or additionally generating a first density of electrons preferably comprises transmitting the first wavelength light through a photo-conducting material in which electron-hole pairs are generated by absorbing photons from the first wavelength light.

Preferably, generating the second additional electron density comprises: transmitting a pulse of light having sufficient energy to generate electron-hole pairs in the photo-conducting material through the modulating material after an electric field substantially homologous with the variations in intensity of the first wavelength light is established in the modulating material; and transmitting thereafter the pulse of light through the photo-conducting layer to generate electron-hole pairs in the photo-conducting material.

Preferably, the pulse length of the pulse is long enough so that a portion of the pulse is in the modulating material after electrons generated responsive to the pulse have been trapped and change the electric field in the modulating material.

Alternatively, the pulse of second wavelength light passes substantially completely through the modulating material before electrons generated in the photo-conducting layer by the second wavelength pulse are trapped and change the electric field in the modulating material.

In some preferred embodiments of the present invention, transmitting second wavelength light through a modulating material comprises transmitting a pulse of second wavelength light through the modulating material and through the photo-conducting material.

Preferably, second wavelength light has sufficient energy to generate electron-hole pairs in the photo-conducting material.

Preferably, generating the second additional electron density comprises: transmitting a pulse of second wavelength light through the modulating material after an electric field substantially homologous with the variations in intensity of the first wavelength light is established in the modulating material; and transmitting thereafter the pulse of light through the photo-conducting layer to generate the second density distribution of electrons.

In some preferred embodiments of the present invention, the pulse length of the pulse is long enough so that a portion of the pulse is in the modulating material after electrons generated responsive to the pulse have been trapped and change the electric field in the modulating material.

In some preferred embodiments of the present invention, the pulse of second wavelength light passes substantially completely through the modulating material before electrons generated in the photo-conducting layer by the second wavelength pulse are trapped and change the electric field in the modulating material.

In some preferred embodiments of the present invention, generating a first and second electron density comprises generating a first and second electron density for each light pulse in a train of first wavelength light pulses, all of which have substantially the same spatial intensity variations, and trapping electrons comprises trapping electrons from densities generated for light pulses in the train of light pulses in a same trapping region.

There is further provided, in accordance with a preferred embodiment of the present invention, a method for encoding information that is encoded in spatial variations of the intensity of light characterized by a first wavelength in light characterized by a second wavelength, the method comprising: transmitting at least one pulse of first wavelength light through a photo-conducting material generating thereby a density distribution of electrons homologous with the spatial variations in intensity of the first wavelength light; trapping electrons from the density distribution of electrons so as to generate an electric field homologous with the spatial variations in a material that modulates a characteristic of light that passes therethrough responsive to an electric field therein; and transmitting a pulse of second wavelength light having sufficient energy to generate electron hole pairs in the photo-conducting layer through the modulating material and through the photo-conducting material thereby modulating the pulse responsive to the electric field and encoding it with the information.

Preferably, the pulse of second wavelength light passes substantially completely through the modulating material before electrons generated in the photo-conducting layer by the second wavelength pulse are trapped and change the electric field in the modulating material.

Alternatively, the method preferably comprises transmitting the pulse of second wavelength light first through the photo-modulating layer and then through the photo-conducting layer and wherein the pulse length of the pulse is such that a portion of the pulse is in the modulating material after electrons generated responsive to the pulse have been trapped and change the electric field in the modulating material.

There is further provided, in accordance with a preferred embodiment of the present invention, a method for encoding information that is encoded in spatial variations of the intensity of light characterized by a first wavelength in light characterized by a second wavelength, the method comprising: receiving a plurality of pulses of first wavelength light all of which have substantially a same pattern of spatial variations of intensity; generating an electron density distribution responsive to each received first wavelength light pulse that is homologous with the spatial variations in intensity of the first wavelength light pulse; accumulating electrons from the generated electron density distributions to generate an electric field homologous with the density distributions in a material that modulates a characteristic of light that passes through the material responsive to an electric field therein; and transmitting the second wavelength light through the modulating material where it is modulated responsive to the electric field therein and encoded thereby with the information.

Preferably, transmitting second wavelength light comprises transmitting a pulse of second wavelength light.

There is further provided, in accordance with a preferred embodiment of the present invention, a method for imaging information encoded in spatial variations of the intensity of light characterized by a first wavelength, with light characterized by a second wavelength, the method comprising: a) encoding a pulse of second wavelength in accordance with a preferred embodiment of the present invention for encoding a pulse of second wavelength light; b) imaging the encoded second wavelength light pulse on a photosensitive surface; and c) repeating a) and b) at least twice, wherein the at least one first wavelength light pulse received in all repetitions has substantially a same spatial variation in intensity.

There is further provided, in accordance with a preferred embodiment of the present invention, a method for imaging an object comprising: collecting first wavelength light reflected or radiated by the object; encoding intensity variations in the first wavelength light in light characterized by a second wavelength, in accordance with a preferred embodiment of the present invention; and imaging encoded second wavelength light on a photosensitive surface.

There is further provided, in accordance with a preferred embodiment of the present invention, a method for determining distances to an object comprising: illuminating the object with at least one pulse train of light pulses characterized by a first wavelength; receiving light reflected by the object from light pulses in the pulse train on a shutter that is opened and closed at times coordinated with times at which light pulses in the pulse train are radiated; encoding intensity variations in reflected first wavelength light transmitted through the shutter into intensity variations in light characterized by a second wavelength, in accordance with a preferred embodiment of the present invention for encoding a pulse train of first wavelength light in second wavelength light; imaging encoded second wavelength light on a photosensitive surface; and determining a distance to a surface element of the object responsive to the intensity of second wavelength light registered in a region of the photosensitive surface that images the surface element.

Preferably, the at least one pulse train comprises a plurality of pulse trains.

In some preferred embodiments of the present invention, the wavelength of first wavelength light is longer than the characteristic wavelength of second wavelength light.

In some preferred embodiments of the present invention, the wavelength of first wavelength light is shorter than the characteristic wavelength of second wavelength light.

In some preferred embodiments of the present invention, the wavelength of first wavelength light is substantially equal to the characteristic wavelength of second wavelength light.

There is further provided, in accordance with a preferred embodiment of the present invention, a wavelength converter comprising: a first port through which light characterized by a first wavelength and having spatial variations in its intensity enters the wavelength converter; a photo-conducting layer through which first wavelength light that enters the converter passes and in which an electron density distribution is generated responsive to the spatial variations; an electron multiplier that receives electrons generated in the photo-conducting layer and produces a larger number of electrons responsive to the received electrons; a trapping region that traps electrons generated in the multiplication layer; a second port through which light characterized by a second wavelength enters the wavelength converter; and a photo-modulation region through which the second wavelength light passes, which photo-modulation region modulates the second wavelength light responsive to an electric field therein and in which the electric field is a field homologous with the spatial variations in the first wavelength light that is generated by the electrons trapped in the trapping region.

Preferably, the multiplication region comprises a plurality of graded-band-gap layers.

Additionally or alternatively, the photo-modulation region preferably comprises an MQW structure having alternating narrow and wide band-gap layers.

In some preferred embodiments of the present invention, the trapping region comprises a reflector that reflects both first and second wavelength light and wherein modulated second wavelength light exits the wavelength converter via the second port. Preferably, the reflecting layer is a dielectric mirror.

In some preferred embodiments of the present invention, a wavelength converter comprises a reflector that reflects first wavelength light and transmits second wavelength light, which reflector is located further from the first port than is the photo-conducting layer and reflects first wavelength light that enters the wavelength converter and passes through the photo-conducting layer so that it passes through the photo-conducting layer a second time. Preferably, the reflector comprises a dielectric mirror.

In some preferred embodiments of the present invention, a wavelength converter comprises a third port through which modulated second wavelength light exits the wavelength converter.

Preferably, the trapping region comprises a reflector that transmits first wavelength light and reflects second wavelength light and wherein the third port is the same as the second port. Preferably, the reflector is a dielectric mirror.

Some wavelength converters in accordance with preferred embodiments of the present invention comprise a light source that radiates pulses of second wavelength light to be modulated by the wavelength converter and the pulse width of a second wavelength light pulse that enters the wavelength converter is less than (cd)/v where c is the speed of light, d is the thickness of the photo-conducting layer and v is a drift velocity of electrons in the photo-conducting layer.

In some preferred embodiments of the present invention, the first and second ports are the same.

Some wavelength converters in accordance with preferred embodiments of the present invention comprise a perforated metallic layer bonded to the photo-conducting layer and in which the photo-conducting layer is formed with holes that are aligned with the perforations in the metallic layer, which holes penetrate or substantially penetrate the full width of the photo-conducting layer. Preferably, the metallic layer is closer to the second port than is the photo-conducting layer.

In some wavelength converters according to preferred embodiments of the present invention the first and third ports are the same.

Some wavelength converters in accordance with preferred embodiments of the present invention comprise a first wavelength shutter operable to enable and prevent first wavelength light from passing through the photo-conducting layer. Preferably, the first wavelength shutter comprises an MQW structure having alternating narrow and wide band-gap layers.

Some wavelength converters in accordance with preferred embodiments of the present invention comprise a second wavelength shutter operable to enable and prevent second wavelength light from entering the wavelength converter. Preferably, the first wavelength shutter comprises an MQW structure having alternating narrow and wide band-gap layers.

There is further provided, in accordance with a preferred embodiment of the present invention, a camera for imaging information encoded in variations in the intensity of light characterized by a first wavelength with light characterized by a second wavelength, the camera comprising: a wavelength converter according to a preferred embodiment of the present invention; a photo-sensitive surface; and optics that receives second wavelength light that exits the wavelength converter and images it on the photo-sensitive surface.

Preferably, the camera comprises a light source that radiates second wavelength light. Preferably, the camera comprises a shutter that blocks first wavelength light from reaching the wavelength converter. Preferably, the shutter is comprised in the wavelength converter.

There is further provided, in accordance with a preferred embodiment of the present invention, a 3D camera for determining distances to an object comprising: a camera according to a preferred embodiment of the present invention that comprises a light source that radiates second wavelength light; a pulsed light source that illuminates the object with at least one pulse train of first wavelength light pulses; and a controller that gates the shutter open at times that are coordinated with times at which light pulses in the at least one pulse train are radiated and following the last light pulse of each of the at least one pulse train, controls the second wavelength light source to illuminate the wavelength converter with a pulse of second wavelength light.

BRIEF DESCRIPTION OF FIGURES

The invention will be more clearly understood by reference to the following description of preferred embodiments thereof read in conjunction with the figures attached hereto. In the figures, identical structures, elements or parts which appear in more than one figure are labeled with the same numeral in all the figures in which they appear. Dimensions of components and features shown in the figures are chosen for convenience and clarity of presentation and are not necessarily shown to scale. The figures are listed below.

DETAILED DESCRIPTION OF PREFERRED EMBODIMENTS

Figure 1A:
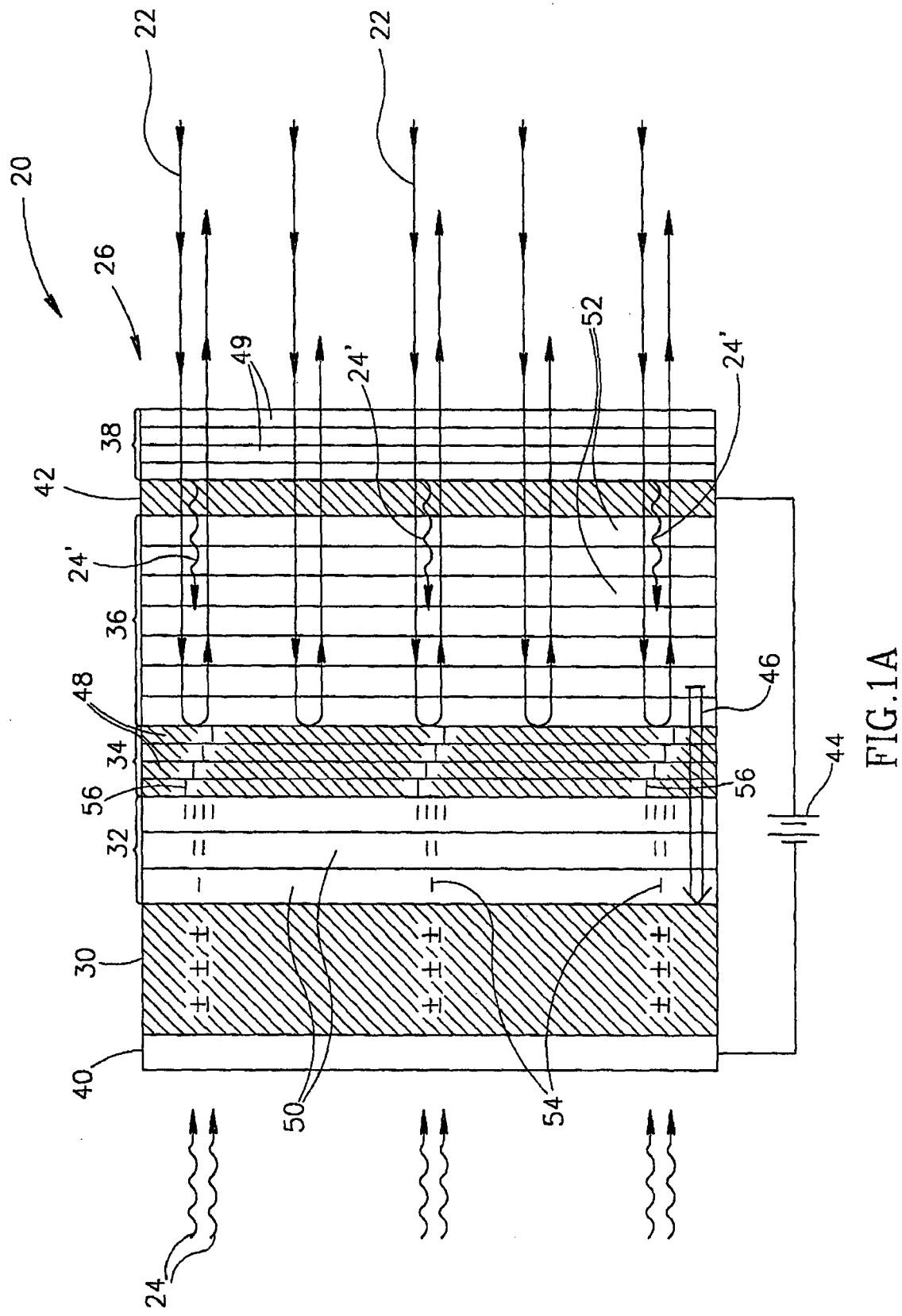
FIG. 1A schematically shows a cross section view of a solid state wavelength converter encoding output light with an image encoded in input light that is incident on the wavelength converter, in accordance with a preferred embodiment of the present invention.

FIG. 1A schematically shows a cross section view of a solid state wavelength converter 20 encoding output light, represented by straight line arrows 22, with an image encoded in input light, represented by wavy arrows 24, in accordance with a preferred embodiment of the present invention. Input light 24 has a spatially varying intensity represented schematically by the clustering of wavy arrows 24 into groups. The varying intensity encodes an image of an object.

Wavelength converter 20 preferably comprises a layered body 26 comprising a heavily p doped layer 40, a photo-conducting layer 30, an electron multiplication region 32, a first dielectric mirror 34, a photo-modulation region 36, a heavily n-doped layer 42 and a second dielectric mirror 38. A power supply 44 back biases the p and n doped conducting layers 40 and 42 and generates an electric field, represented by and having a direction indicated by double arrow 46, in the layers sandwiched between them. Electric field 46, while having a substantially constant direction, will have a magnitude that varies from layer to layer depending upon the characteristics of the materials in the layers.

First and second dielectric mirrors 34 and 38, which comprise layers of appropriate semiconductor materials 48 and 49 respectively, are designed to reflect output light 22 and input light 24 respectively. Preferably first dielectric mirror 34 is substantially transparent to input light 24 and second dielectric mirror 38 is substantially transparent to output light 22. Preferably multiplication region 32 comprises a plurality of graded-band-gap layers 50 that form a graded-band-gap staircase-multiplier. Preferably photo-modulation region 36 comprises a plurality of alternating low and high band-gap layers 52 that form a Multiple Quantum Well (MQW) modulator of a type described in PCT Publication WO 99/40478, the disclosure of which is incorporated herein by reference.

Input light 24 enters wavelength converter 20 through conducting layer 40 and is incident on photo-conducting layer 30. In photo-conducting layer 30, photons in input light 24 are absorbed and generate electron-hole pairs in photo-conducting layer 30, which are represented by "+" and "−" sign pairs. Photons in input light 24 that are not absorbed travel on through other layers of wavelength converter 20 until they are incident on second dielectric mirror 38 where they are reflected back to pass through photo-conducting layer 30 a second time and generate more electron-hole pairs. Photons from input light 24 that are reflected from second dielectric mirror 38 are represented wavy arrows 24' of "reflected input light" that originate in second dielectric mirror 38. The number of electron-hole pairs generated per unit volume at a point in photo-conducting layer 30 is substantially proportional to the intensity of input light 24 at the point. As a result, the density of generated electron-hole pairs images the object encoded in the intensity variations of input light 24.

Electrons from the electron-hole pairs drift in electric field 46 towards multiplication region 32. In multiplication region 32 the electrons multiply in an avalanche process. The avalanche process is schematically illustrated in FIG. 1A for an "initial" electron, represented by a minus sign 54, which enters multiplication region 32 from each of the regions of photo-conducting layer 30 in which electron-hole pairs are produced by input light 24. Substantially every time that an electron drifting through multiplication region 32 under the influence of electric field 46 passes from a first to a second graded-band-gap layer 50, the electron ionizes material in the second graded-band-gap layer 50 to generate an additional electron. That is, each time an electron passes from one to another graded-band-gap layer 50 it "doubles itself". An ideal graded-band-gap staircase-multiplier with "n" graded-band-gap layers provides an electron multiplication factor substantially equal to $2^{(n-1)}$.

In FIG. 1A, multiplication region 32 comprises, by way of example, three graded-band-gap layers 50 and for each initial electron 54 that enters multiplication region 32, four electrons are shown exiting multiplication region 32. Theoretically an "ideal" multiplication region 32 with three graded-band-gap layers provides an "electron multiplication factor" equal to four. The number of graded-band-gap layers used in multiplication region 32, in accordance with a preferred embodiment of the present invention, can be different from three and different numbers of graded-band-gap layers provide different electron multiplication factors.

Electrons that exit multiplication region 32 are trapped in first dielectric mirror 34 and generate a spatially varying electron charge density, i.e. "a charge image", in first dielectric mirror 34. The trapped electrons in first dielectric mirror 34 are represented by minus signs and their clustering schematically indicates a varying density that is a charge image. The trapped electron density is substantially homologous with the density of electron-hole pairs generated in photo-conducting layer 30 by input light 24. The charge image therefore images the object imaged by variations of the intensity of input light 24 in photo-conducting layer 30.

The charge image produces a spatially varying electric field in photo-modulation region 36, i.e. a "modulation field", having a magnitude at a point in photo-modulation region 36 that is substantially proportional to the charge density of the charge image in a region of dielectric mirror 34 directly opposite the point. Variations in the magnitude of the modulation field therefore also image the object imaged by input light 24 in photo-conducting layer 30.

The absorption coefficient for output light 22 of material in photo-modulation region 36 is a function of the electric field in photo-modulation region 36. In some preferred embodiments of the present invention, the absorption coefficient increases with increases in the magnitude of the electric field and photo-modulation region 36 is a negative image modulator. In some preferred embodiments of the present invention, the absorption coefficient decreases with increases in the electric field and photo-modulation region 36 is a positive image modulator.

In some preferred embodiments of the present invention, for some wavelengths of output light 22, the absorption coefficient increases with increasing electric field and for other wavelengths of output light 22 the absorption coefficient decreases with increasing electric field. In this case, photo-modulation region 36 is a positive image modulator for some wavelengths of output light 22 and a negative image modulator for other wavelengths of output light 22.

Figure 1B:
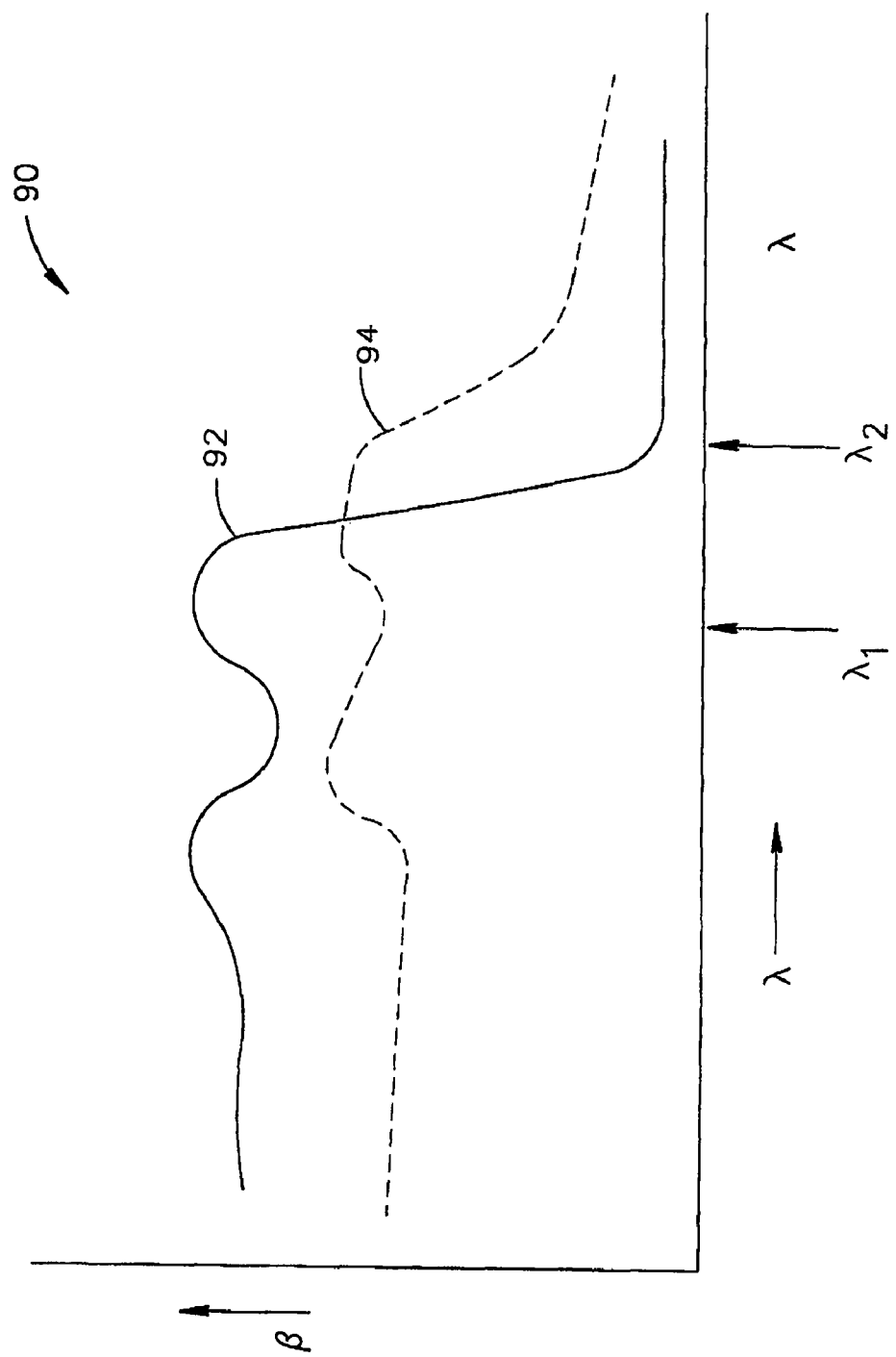
FIG. 1B schematically shows dependence of absorption coefficient for output light on electric field and wavelength of the output light for a photo-modulation layer, in accordance with a preferred embodiment of the present invention.

FIG. 1B shows a graph 90 that schematically illustrates the dependence of absorption coefficient on wavelength and electric field for a photo-modulation region 36 comprising an MQW modulator of a type described in the above referenced PCT Publication WO 99/40478, in accordance with a preferred embodiment of the present invention. The photo-modulation layer is a positive image modulator for some wavelengths of light and a negative image modulator for other wavelengths of light.

In graph 90, wavelength is measured along the abscissa and absorption coefficient, "β", is measured along the ordinate. Curve 92 shows the relationship between wavelength and coefficient of absorption with no electric field present in photo-modulation region 36. Dashed curve 94 shows the relationship between wavelength and absorption coefficient for an arbitrary electric field present in photo-modulation region 36. For a wavelength $\lambda_1$, noted on the graph, photo-modulation region 36 is a positive image modulator and absorption coefficient β decreases with increase in electric field. For a wavelength $\lambda_2$ photo-modulation region 36 is a negative image modulator and β increases with increase in electric field.

Photo-modulation region 36 is normally partially absorbing for output light 22 and under the influence of electric field 46 alone, which is relatively uniform, the absorption coefficient is relatively spatially homogeneous in photo-modulation region 36. The modulation field is substantially parallel to electric field 46. Therefore, the magnitude of the electric field in photo-modulation region 36 increases wherever the modulation field in photo-modulation region 36 is non-zero.

The modulation field therefore generates spatial variations in the absorption coefficient of photo-modulation region 36 for output light 22 that has a pattern homologous with the pattern of variations in the intensity of input light 24. If the photo-modulation layer is a negative image modulator, the magnitude of the electric field increases the absorption coefficient in a pattern that is homologous with the pattern of variations in the intensity of input light 24. If the photo-modulation layer is a positive image modulator, the electric field decreases the absorption coefficient in a pattern that is homologous with the pattern of variations in the intensity of input light 24. The pattern of spatial variations of the absorption coefficient in photo-modulation region 36 therefore images the object imaged with input light 24.

Referring again to FIG. 1A, after the modulation field is established in photo-modulation region 36, output light 22, which is radiated from an appropriate light source (not shown), is caused to be incident on second dielectric mirror 38 in a direction substantially perpendicular to the layers in layered body 26. The arrowed lines that represent output light 22 schematically trace paths of light rays in output light 22 as they enter and exit wavelength converter 20. Output light 22 incident on second dielectric mirror 38 from outside layered body 26 has uniform intensity over the surface of second dielectric mirror 38. It passes through conducting layer 42 and photo-modulation region 36 until it reaches first dielectric mirror 34. At first dielectric mirror 34, output light 22 is reflected to pass through photo-modulation region 36 and conducting layer 42 a second time and then exit wavelength converter 20 through second dielectric mirror 38.

In photo-modulation region 36, the intensity of output light 22 is spatially modulated in a plane parallel to the layers in wavelength converter 20 by the variations in the absorption coefficient of photo-modulation region 36. In FIG. 1A, by way of example, photo-modulation region 36 is assumed to be a positive image modulator. The lengths of arrowed lines representing output light 22 exiting wavelength converter 20 schematically represent the intensity of output light 22 exiting wavelength converter 20. Exiting arrowed lines representing output light 22 are therefore relatively long where the density of trapped electrons in first dielectric mirror 34 is high and relatively short where the density of trapped electrons is non-existent. The pattern of spatial modulation of output light 22 is a positive image of spatial variations of intensity of input light 24 and of the density distribution of electrons trapped in dielectric mirror 34.

The presence of multiplication region 32 increases the sensitivity of wavelength modulator 20 substantially over the sensitivities of prior art wavelength converters. For a same intensity of input light, wavelength converter 20 generates more trapped electrons than prior art wavelength converters and thereby provides a more intense modulation field than prior art wavelength converters. Therefore, for a same intensity of input light, wavelength converter 20 modulates output light to a higher degree than prior art wavelength converters. As a result, wavelength converter 20 can provide an image of an object from input light having intensity below that required by prior art converters.

By way of example, in accordance with a preferred embodiment of the present invention, wavelength converter 20 is designed to accept input light 24 having a wavelength of 1,500 nanometers and provide modulated output light 22 having a wavelength of 850 nanometers. Highly doped conducting layers 40 and 42 are preferably each 400 nanometers thick and formed from AlGaAs. Preferably, photo-conducting layer 30 is formed from InGaAs and is on the order of 500 nanometers thick. Graded-band-gap layers 50 in multiplication region 32 are preferably formed from AlGaAs in which, in each graded-band-gap layer 50, the concentration of Al is graded from zero to a desirable maximum in the direction of electron drift caused by electric field 46 in the layers. Preferably the thickness of graded-band-gap layers 50 is about 150 nanometers. Layers 48 in first dielectric mirror 34, which also traps electrons exiting from multiplication region 32, preferably are alternating layers of low temperature GaAs and AlGaAs that are, preferably, on the order of 150 nanometers thick. Preferably, narrow and wide band-gap layers 52 in photo-modulation region 36 are formed from GaAs and $Al_xGa_{(1-x)}$ and are approximately 7-10 nm thick. Layers 49 in second dielectric mirror 38 are preferably alternating layers of GaAs and AlGaAs that are, preferably, about 200 nanometers thick. Layers 49 may also be formed from regular dielectric material. In some preferred embodiments of the present invention, the positions of dielectric mirror 38 and conducting layer 42 are exchanged. In these preferred embodiments of the present invention dielectric mirror layers 49 are preferably formed from semiconductor material. In operation, preferably a potential difference of between 50 and 100 volts is applied between conducting layers 40 and 42 by power supply 44 to generate a field on the order of about $10^5$ volts/cm in wavelength converter 20.

The materials and thicknesses of the above mentioned layers and their order are given by way of example and other materials and thicknesses for the layers and different orders thereof will occur to a person of the art and can be advantageous. Such materials and thicknesses and orders of the layers will depend, inter alia, on the wavelengths of the input and output light, on the operating voltages and the desired sensitivity of the wavelength converter.

Figure 2:
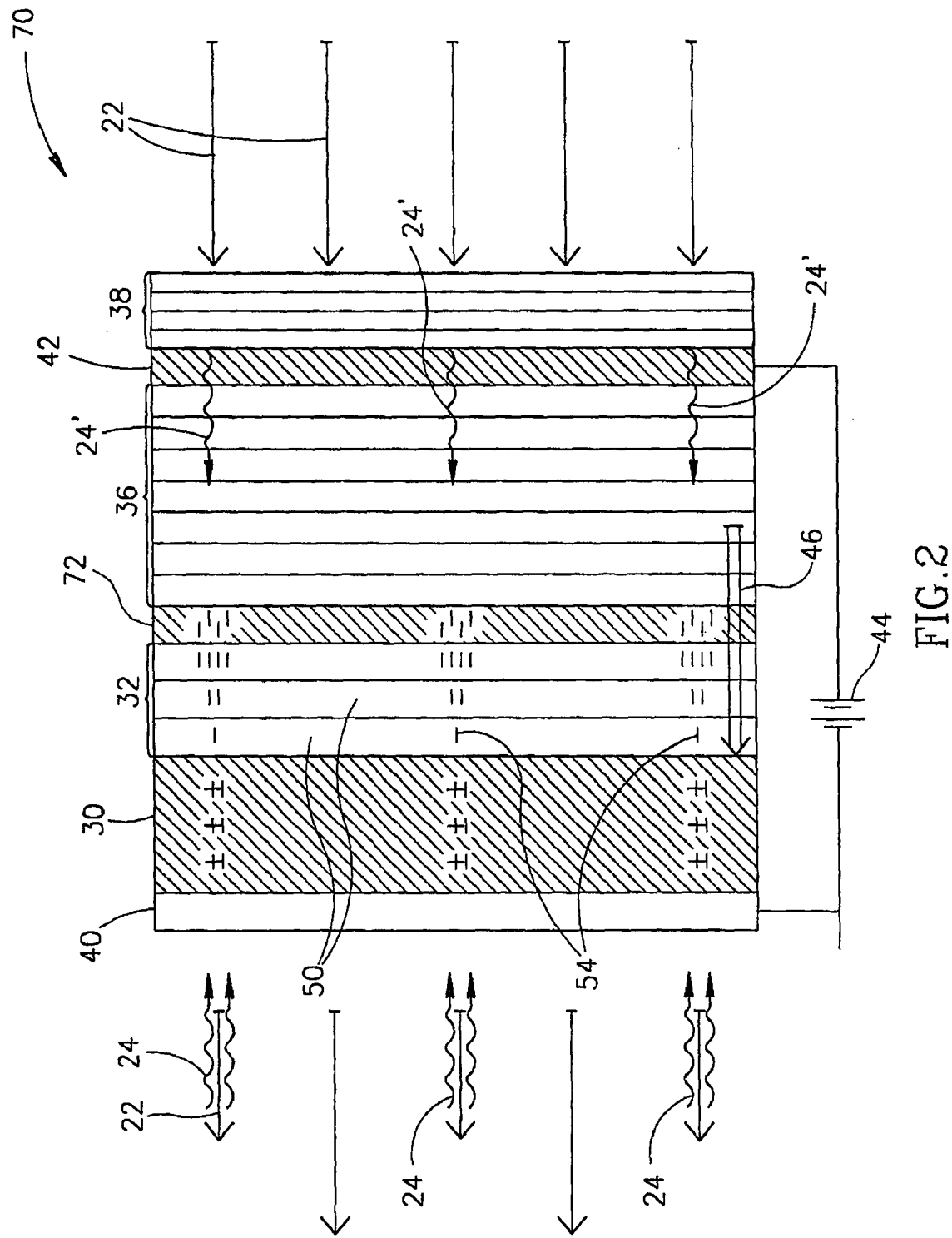
FIG. 2 schematically shows a cross section view of another solid state wavelength converter encoding output light with an image encoded in input light that is incident on the wavelength converter, in accordance with a preferred embodiment of the present invention.

FIG. 2 schematically shows a cross section view of another solid state wavelength converter 70 encoding output light 22 with an image encoded in input light 24.

Wavelength converter 70 comprises the same layers that wavelength converter 20 comprises, except that first dielectric mirror 34 of wavelength converter 20 is replaced in wavelength converter 70 by a trapping layer 72. Trapping layer 72 is preferably a 200 nm layer formed from low temperature AlGaAs. Unlike wavelength converter 20, wavelength converter 70 does not comprise any layer designed to reflect output light 22. A power supply 44 generates an electric field 46 in the layers of wavelength converter 70. In wavelength converter 70 it is assumed, by way of example, that photo-modulation region 36 is a negative image modulator or a photo-modulation region operable as a positive or negative image modulator that is being operated as a negative image modulator.

Electrons are produced and multiplied in photo-conducting layer 30 and multiplication region 32 of wavelength converter 70 similarly to the manner in which electrons are produced and multiplied in wavelength converter 20. Input light 24 is incident on layer 40 and passes into photo-conducting layer 30 where it generates electron-hole pairs. Photons in input light 24 that are not absorbed in photo-conducting layer 30 travel on through other layers in wavelength converter 70 until they reach dielectric mirror 38 where they are reflected to pass through photo-conducting layer 30 a second time and then exit the wavelength converter. Photons from input light 24 that are reflected by dielectric mirror are represented by curly arrows 24'. Electrons produced in photo-conducting layer 30 are multiplied in multiplication region 32.

In wavelength converter 70 however, after they are multiplied and exit multiplying region 32, electrons in wavelength converter 70 are not trapped in a dielectric mirror as they are in wavelength converter 20, but instead are trapped in trapping layer 72. (Electrons trapped in trapping layer 72 are represented by clusters of minus signs.) Trapping layer 72 is preferably thinner than dielectric mirror 34, which traps electrons in wavelength converter 20, and concentrates trapped electrons in a smaller volume than dielectric mirror 34. As a result, a modulation field generated by trapped charge in wavelength converter 70 "tracks" an input image encoded in input light 24 with greater fidelity than a modulation field in wavelength converter 20.

Output light 22 may enter wavelength converter 70 either through dielectric mirror 38 or through conducting layer 40. In FIG. 2, output light 22 enters wavelength converter 70, by way of example, through dielectric mirror 38. (Input light 24 however, must enter wavelength converter 70 through conducting layer 40 because of the presence of dielectric mirror 38. Entrance through dielectric mirror 38 is not possible because dielectric mirror 38 reflects input light 24. In some preferred embodiments of the present invention, dielectric mirror 38 is not present and input light 24 can enter wavelength converter 70 through either conducting layer 40 or conducting layer 42. In some preferred embodiments of the present invention, dielectric mirror 38 is positioned to the left of photo-conducting layer 30 and input light 24 enters and exits wavelength converter 70 from the right through conducting layer 42.)

After entering wavelength converter 70 output light 22 passes through conducting layer 42 and through photo-modulation region 36 where it is modulated by a modulation field generated by electrons trapped in trapping layer 72. After being modulated, output light 22 continues on to pass through trapping layer 72, multiplication region 32 and photo-conducting layer 30 and then exits wavelength converter 70 through conducting layer 40.

The intensity of output light 22 exiting through conducting layer 40 is schematically indicated by the length of arrows representing output light 22 exiting wavelength converter 70. As noted above photo-modulation region 36 operates as a negative image modulator. Therefore, output light 22 passing through regions of photo-modulation region 36 in which the modulating field is relatively high (which regions of photo-modulating region 36 are contiguous with regions of trapping layer 72 in which the concentration of trapped electrons is relatively large) is relatively strongly absorbed. Output light 22 passing through regions of photo-modulation region 36 in which the modulating field is relatively low (i.e. photo-modulation regions contiguous with relatively low concentrations of trapped electrons in trapping layer 72) is relatively weakly absorbed. Therefore, short straight arrows 22 that indicate modulated output light 22 in FIG. 2 having relatively weak intensity are located where input light 24 is relatively strong, i.e. at locations of curly arrows 24 indicating input light 24 entering wavelength converter 70. Long straight arrows 22 indicating modulated output light 22 having relatively strong intensity are located in regions where input light 24 is relatively weak or non existent, i.e. where there are no curly input arrows 24 entering wavelength converter 70. The pattern of spatial modulation of output light 22, after passing through modulation region 36, is a negative image of the spatial modulation of input light 24. (However, by operating photo-modulation 36 in a wavelength range in which it performs as a positive image modulator, a positive image of the spatial modulation of input light 24 is generated and the locations of short and long straight arrows 22 are interchanged.)

In passing through photo-conducting layer 30, if the energy of photons in output light 22 is greater than the energy of photons in input light 24, output light 22 will generate electron-hole pairs in photo-conducting layer 30. As in the case of electrons from electron-hole pairs generated by input light 24, electrons from electron-hole pairs generated by output light 22 are multiplied in multiplication region 32 and trapped in trapping layer 72. The "output light 22 trapped electrons" modify the modulation field in photo-modulation region 36 and degrade the correspondence between the modulation field and the image encoded in input light 24. If the modified modulation field were degraded and used to modulate output light 22, output light 22 would not be properly encoded with the image encoded in input light 24.

The output light electrons degrade the correspondence because photo-modulation region 36 is a negative image modulator and the modulation pattern of the output light is a "negative" of the image encoded in the input light. However it is to be noted, that even if output light 22 were to enter modulator 70 through conducting layer 40 and pass through photo-conducting layer 30 before output light 22 is modulated with a "negative image", electrons generated by the output light would still corrupt correspondence between the input image and the modulation field. This is because output light 22 would, assuming output light 22 has a uniform spatial intensity before it is modulated, produce a uniform density of electrons in photo-conducting layer 30. This electron density would in turn generate a uniform trapped electron density in trapping layer 72 that would distort, and in general reduce the contrast of, a trapped charge image in trapping layer 72.

In accordance with a preferred embodiment of the present invention, to insure that output light 22 is accurately encoded with the image encoded in input light 24, output light 22 is provided in short pulses of light. The length of a pulse of output light 22 is determined so that the pulse passes through and exits photo-modulation region 36 before electrons that the pulse of output light 22 generates in photo-conducting layer 30 can substantially alter the modulation field. For example, assume that multiplication region 32 has a thickness "d" and that electrons move through multiplication region 32 with a drift velocity "v". Electrons produced in photo-conducting layer 30 by a pulse of output light 22 cannot reach trapping layer 72 earlier than a time $t=d/v$ after the light pulse first enters photo-conducting layer 30. If the pulse length of pulses of output light 22, in accordance with a preferred embodiment of the present invention, is shorter than "t" (assuming the speed of light is much greater than v), then electrons generated by a pulse of output light 22 in photo-conducting layer 30 will not affect the modulation of the output pulse. In some preferred embodiments of the present invention, the output light pulse length may be longer than t without compromising the accuracy of modulation of output light 22. This is possible since the modulation field is generally not substantially "corrupted" until a substantial number of the electrons generated by a pulse of output light 22 in photo-conducting layer 30 reaches trapping layer 72.

Assume for example, that the modulation field is not substantially modified until electrons from photo-conducting layer 30 generated at a depth δ inside photo-conducting layer 30 by a pulse of output light 22 reach trapping layer 72. If the pulse length of a pulse of output light 22 is less than or equal to $(d+\delta)/v$, then modulation of the pulse in photo-modulation region 36 will not be substantially corrupted by electrons that the pulse generates in photo-conducting layer 30. By way of example, let d equal 1000 nm (i.e. seven 150 nm graded-bandgap layers), let δ equal 5000 nm and v equal about $10^7$ cm/sec, then $t=6\times10^{-11}$ sec. If the pulse length of output light 22 is 60 picoseconds or less, for this example, electrons generated by the pulse in photo-conducting layer 30 will not corrupt the modulation of the pulse.

Once a first pulse of output light 22 has passed through converter 70, a subsequent second pulse of output light 22 is preferably not transmitted through converter 70 until sufficient time has passed for trapped electrons from the first pulse to escape from trapping layer 72. This assures that the second pulse of output light 22 is not encoded by a modulation field generated by charge produced by the passage of the first pulse of output light through wavelength converter 70. Typically, trapped electrons escape a trapping layer formed from AlGaAs in a "relaxation" of about 1 msec. Wavelength converter 70 (and wavelength converter 20 as well) can therefore be used to convert input images encoded in input light 24 to output images about once per millisecond. This rate is amply sufficient to provide images, for example, at video frame rates of between 25 and 30 frames/sec.

For video purposes, the video frame rate determines a required minimum intensity for output light pulses 22, assuming that all output light pulses 22 have substantially the same intensity. Assume for example that an amount of energy E is required to form a video image on an appropriate light sensitive surface. If this energy is to be provided by encoded output light pulses 22, then considering that wavelength converter 70 can image a scene at a rate of about an image every millisecond, a maximum of about thirty encoded light pulses 22 can be used to provide the required video image. Let $\tau$ be the pulse width of output light pulses 22 and $\alpha$ be the fraction of the intensity of an output light pulse 22 that remains after the output light pulse passes through photo-conducting layer 30. Then the peak intensity of a light pulse 22, in accordance with a preferred embodiment of the present invention, should be approximately $E/(30\alpha\tau)$.

The above discussion is based on the assumption that the passage of a pulse of output light 22 through wavelength converter 70 destroys the correspondence between an input image and a trapped charge image. The destruction of the correspondence is either a result of the output light pulse traversing photo-conducting layer 30 prior to passing through the photo-modulation region 36 or because photo-modulation region 36 is a negative image modulator.

In some preferred embodiments of the present invention, photo-modulation region 36 is a positive image modulator and output light 22 passes through photo-modulation region 36 before passing through photo-conducting region 36. In these preferred embodiments of the present invention the density of electron-hole pairs generated by output light 22 in photo-conducting layer 30 tends to be homologous with the original density of electron hole pairs generated by input light 24. This is because, as noted above, the modulation pattern of output light 22 is a positive image of variations in the intensity of input light 24, i.e. a positive image of the input image. In these preferred embodiments of the present invention, electrons produced by the output light pulse are multiplied and trapped in trapping layer 72 in a pattern that is substantially the same as the pattern of electron density in the charge image generated by input light 24. The effect of the passage of modulated output light through photo-conducting layer 30 is to amplify the trapped charge image while preserving its form and thereby its correspondence with the input image.

However, the intensity of output light 22 is easily such that the quantity of electrons generated by output light 22 in photo-conducting layer 30 can saturate wavelength converter 70. If output light 22 saturates wavelength converter 70, the effect of output light 22 passing through photo-conducting layer 30 is to degrade the correspondence between the modulation field and the input image encoded in input light 24 rather than to amplify the charge image while preserving the charge image's form. Therefore, in accordance with some preferred embodiments of the present invention the intensity and pulse length of a pulse of output light 22 is controlled so that the passage of an output pulse through photo-conducting layer 22 does not saturate wavelength converter 70.

In accordance with a preferred embodiment of the present invention, when modulation region 36 of wavelength converter 70 is a positive image modulator, pulses of output light 22 are substantially continuously transmitted through wavelength converter 70 to "interrogate" a trapped charge image in the wavelength converter. As long as the output light pulses do not saturate wavelength converter 70, the charge image will not be distorted and each interrogation pulse of output light 22 will be properly modulated by the charge image. A rate at which pulses of output light 22 can be transmitted through wavelength converter 70 without damaging correspondence between a charge image and an input image is determined by the pulse length of output light pulses, their intensity and the requirement that the output light pulses do not saturate the wavelength converter. However, if images to be provided with wavelength converter 70 change significantly in a time period less than the relaxation time of the wavelength converter, a periodic time delay between series of output light pulses 22 transmitted through wavelength converter 70 is required. A series of output light pulses should only last for a period of time during which an image to be acquired is substantially unchanged. Thereafter, a time delay is required to allow an "old image" to decay sufficiently so as not to overlay and corrupt a new image. The time delay should of course be approximately equal to the relaxation time of the wavelength converter.

Furthermore as noted above, a pulse of output light 22 that does not saturate wavelength converter 70, amplifies a charge image in the wavelength converter while it interrogates the charge image. In some preferred embodiments of the present invention therefore, at least one pulse of output light 22 is used to multiply electrons generated by input light 24. For example after a charge image is established in wavelength converter 70, at least one pulse of output light 22 that does not saturate the wavelength converter is transmitted to amplify the number of trapped electrons in the charge image. (The pulse may of course also function as an interrogation pulse.) A short intense pulse of output light 22 (which for example might saturate wavelength converter 70 and destroy the charge image) is then transmitted through wavelength converter 70 to "read out" the charge image. In some preferred embodiments of the present invention, a pulse of output light 22 is made long enough so that it generates electrons in photo-conducting layer 30 that amplify the charge image while a portion of the pulse is still in the photo-modulation layer. The modulation of the portion of the pulse in the photo-modulation is thereby amplified. "The early portion of the pulse amplifies the modulation of the latter portion of the pulse."

By using output light 22 to multiply electrons, in some preferred embodiments of the present invention, the number of layers in multiplication region 32 may be reduced or multiplication region 32 eliminated.

It should be noted that light other than output light 22 can be used to multiply electrons in accordance with preferred embodiments of the present invention, and using light other than output light 22 to multiply electrons can be advantageous. Light of any wavelength having energy sufficient to generate electron-hole pairs in photo-conducting layer 30 can be used to multiply electrons in the same manners described above in which output light 22 is used to multiply electrons, in accordance with preferred embodiments of the present invention.

In some preferred embodiments of the present invention, input light 24 is incident on wavelength converter 70 so as to establish a steady state charge image in the wavelength converter in which trapped charge generated responsive to input light balances leakage of trapped charge out of trapping layer 72. The charge image is then regularly "interrogated" with pulses of output light 24 subject to saturation conditions noted above. This interrogation destabilizes the charge image. After waiting a time sufficient for the effects of the interrogation to decay, an additional interrogation is performed.

Whereas "steady state" operation has been described for wavelength converter 70, steady state operation is also possible with wavelength converter 20 and other wavelength converters, in accordance with preferred embodiments of the present invention, and can be advantageous.

Figure 3:
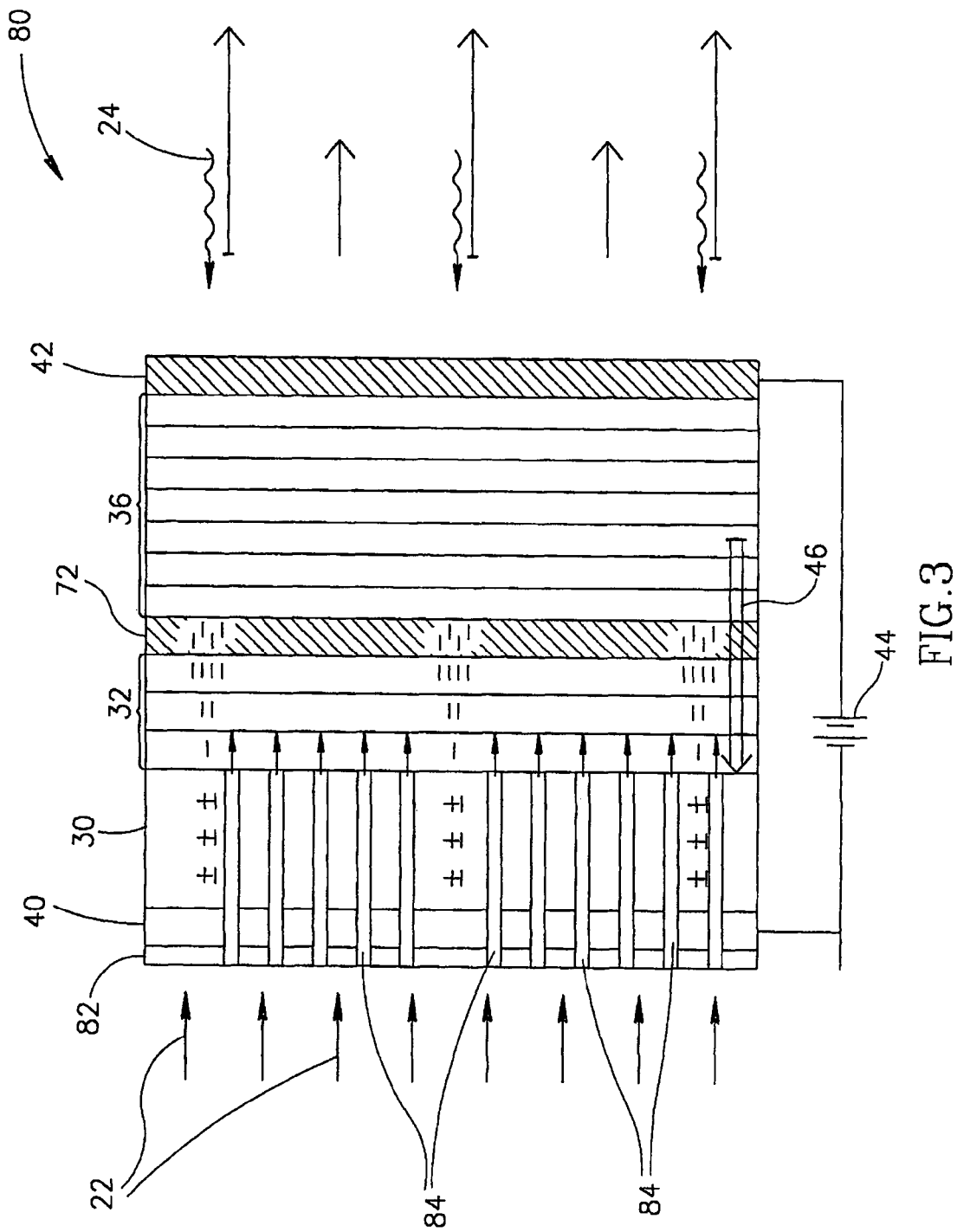
FIG. 3 schematically shows a cross section view of another solid state wavelength converter encoding output light with an image encoded in input light that is incident on the wavelength converter, in accordance with a preferred embodiment of the present invention.

FIG. 3 schematically shows another wavelength converter 80 in accordance with a preferred embodiment of the present invention. Wavelength converter 80 is similar to wavelength converter 70 and comprises many of the same layers as wavelength converter 70. However, wavelength converter 80 does not comprise a dielectric mirror 38, which is comprised in wavelength converter 70. In addition, a thin metallic layer 82 is bonded to conducting layer 40 comprised in wavelength converter 70. Metallic layer 82 is drilled through with holes that extend into photo-conducting layer 30 and penetrate substantially the full width of the photo-conducting layer or penetrate completely through photo-conducting layer 30. The holes in metallic layer 82 and photo-conducting layer 30 are formed using methods known in the art such as ion beam drilling.

Input light 24 enters wavelength converter 80 through conducting layer 42, passes through the layers of wavelength converter 80 until it reaches photo-conducting layer 30 in which most of input light 24 is absorbed and generates electron-hole pairs. Light from input light 24 that is not absorbed in photo-conducting layer 30 continues on to metallic layer 82. Some of the light that is incident on metallic layer 82 is reflected by metallic layer 82 to pass through photo-conducting layer 30 a second time and produce further electron-hole pairs. As in other described wavelength converters in accordance with preferred embodiments of the present invention, electrons produced by input light 24 in photo-conducting layer 30 are preferably multiplied in a multiplication region 32 and trapped in a trapping region 72. Trapped electrons generate a modulation field in a photo-modulation region 36 that modulates output light 22. Photo-modulation region 36 is assumed by way of example to be operating as a positive image modulator.

Output light 22 enters wavelength converter 80 through holes 84 in metallic layer and photo-conducting layer 30, passes through all the layers of wavelength converter 80 and exits wavelength converter 80 from conducting layer 42. Output light 22 therefore does not pass through or substantially interact with any material of photo-conducting layer 30. It therefore does not generate electrons in photo-conducting layer 30 that might degrade correspondence of a trapped charge image in trapping layer 72 with an input image encoded in input light 24.

It might be expected that holes 84 would result in output light 22 not being modulated in correspondence with an input image encoded in input light 24. Not only does output light 22 not generate electrons in holes 84 but input light 24 also does not generate electron-hole pairs in holes 84. It would therefore be expected that a charge image and a modulation electric field in photo-modulating region 36 generated in response to the input image would have "holes" that correspond to holes 84 in metallic layer 82 and photo-conducting layer 30. Since output light 22 traverses wavelength converter 80 substantially only where there are holes, output light 22 would therefore substantially never "see" the trapped charge image nor the modulating field that it generates in modulating region 36. However, in accordance with a preferred embodiment of the present invention, holes 84 are formed with diameters that are sufficiently small so that lateral spreading of the charge image and its modulating electric field fill in the expected holes in the charge image and modulating electric field. As a result, the charge image and its modulation field are relatively "intact" and laterally smooth with their integrity substantially uncompromised. Output light 22 therefore does not see "holes" in the modulation field and is properly modulated in correspondence with the input image. The intensity of unmodulated output light 22 is controlled so that the amount of output light 22 that enters and is modulated in wavelength converter 80 is sufficient to provide an acceptable image of the variations in intensity of input light 24.

Figure 4:
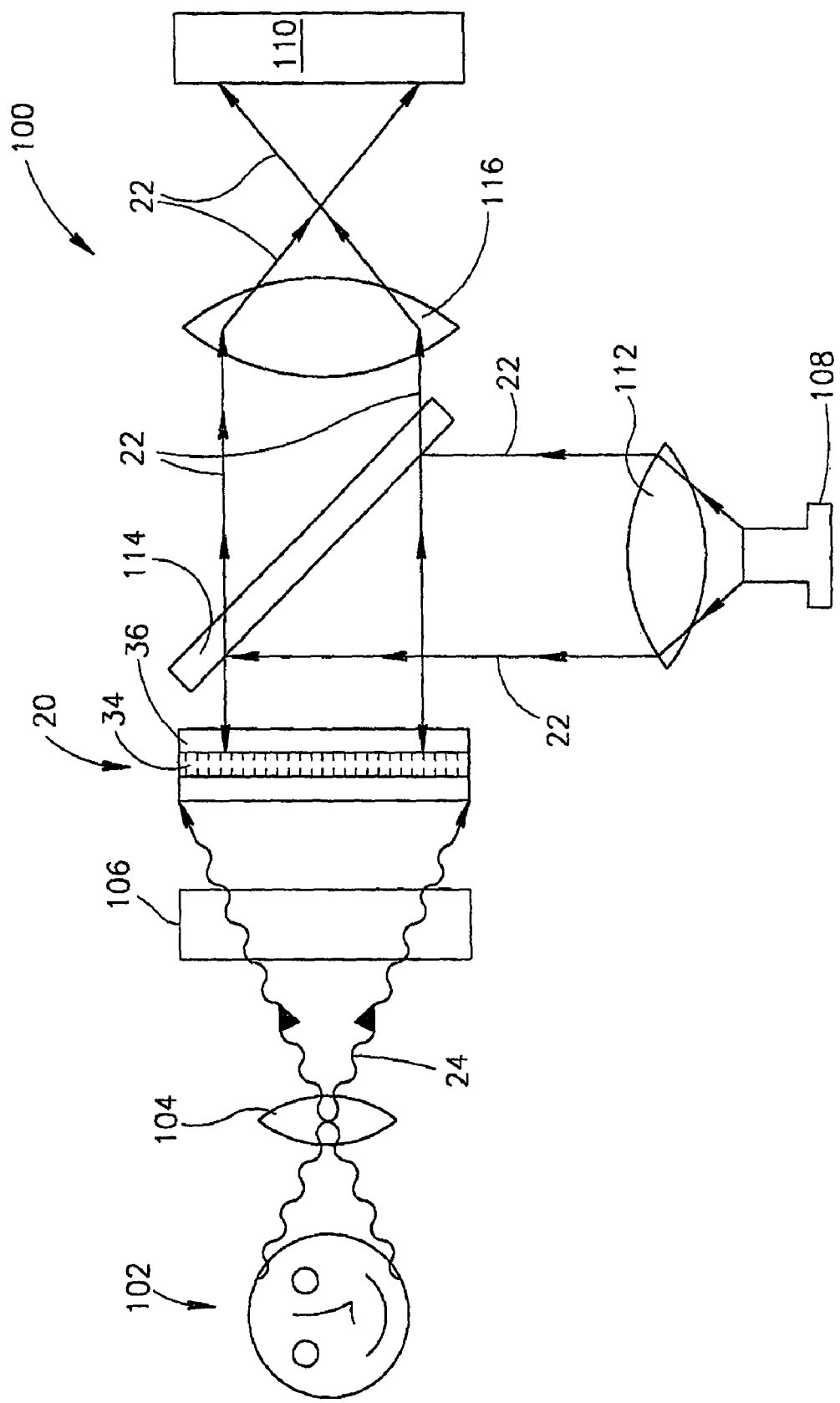
FIG. 4 schematically shows a camera comprising a wavelength converter, in accordance with a preferred embodiment of the present invention.

FIG. 4 schematically shows a camera 100 comprising wavelength converter 20 shown in FIG. 1A, imaging an object 102, in accordance with a preferred embodiment of the present invention. In FIG. 4 only those features and elements of wavelength converter 20 that are required by the following discussion are shown.

Camera 100 preferably comprises collecting optics 104, a shutter 106, a light source 108 that provides output light for wavelength converter 20 and a light sensitive surface 110 such as a CCD. Preferably light source 108 is a laser diode. Preferably, shutter 106 is a large aperture shutter of a type described in PCT Publication WO 99/40478 referenced above. Preferably, collecting optics 104 is shielded with an appropriate filter (not shown) that transmits substantially only light that is to be imaged with camera 100. A controller (not shown) controls opening and closing shutter 106, turning on and off light source 108 and/or the intensity of light radiated by light source 108.

To image object 102, the controller opens shutter 106 for an appropriate period of time during which light from object 102, represented by wavy arrowed lines 24, is collected by collecting optics 104 and transmitted through shutter 106 so that it images object 102 on wavelength converter 20. Light 24 from object 102, focused on wavelength converter 20 is input light to wavelength converter 20 and generates a trapped electron charge image of object 102 in first dielectric mirror 34 of wavelength converter 20, as described above. The charge image is schematically represented by "trapped" minus signs in first dielectric mirror 34.

Following formation of the charge image, the controller turns light source 108 on and off so that light, i.e. output light for wavelength converter 20, represented by arrowed lines 22 is radiated by light source 108. Output light 22 is preferably collimated by a collimating lens 112 and transmitted to a beam splitter 114 that directs output light 22 so that it is incident on wavelength converter 20.

Incident output light 22 is modulated in photo-modulation region 36 of wavelength converter 20 and reflected out of wavelength converter 20 by dielectric mirror 34 back towards beam splitter 114. Output light 22 from wavelength converter 20 that is incident on beam splitter 114 is focused by appropriate imaging optics 116 to produce an image of object 102 on light sensitive surface 110. The controller controls the length of time that light source 108 radiates output light 22 and/or the intensity of output light 22 so that the amount of output light 22 incident on light sensitive surface 110 is sufficient to provide the image of object 102.

In some preferred embodiments of the present invention, camera 100 comprises a light source that illuminates object 102 with light having a wavelength characteristic of input light of wavelength converter 20. Input light from object 102 is light from the light source that is reflected by object 102. Preferably, the controller controls the light source to turn the light source on and off and/or to determine the intensity of light radiated by the light source. In some cameras, in accordance with a preferred embodiment of the present invention, that comprise a source of input light as described above, shuttering of input light is not required and the light source is pulsed instead.

Whereas in camera 100 shutter 106 and wavelength converter 20 are shown as separate optical elements, in some preferred embodiments of the present invention, shutter 106 and wavelength converter 20 are integrated together to form a single optical element.

Figure 5:
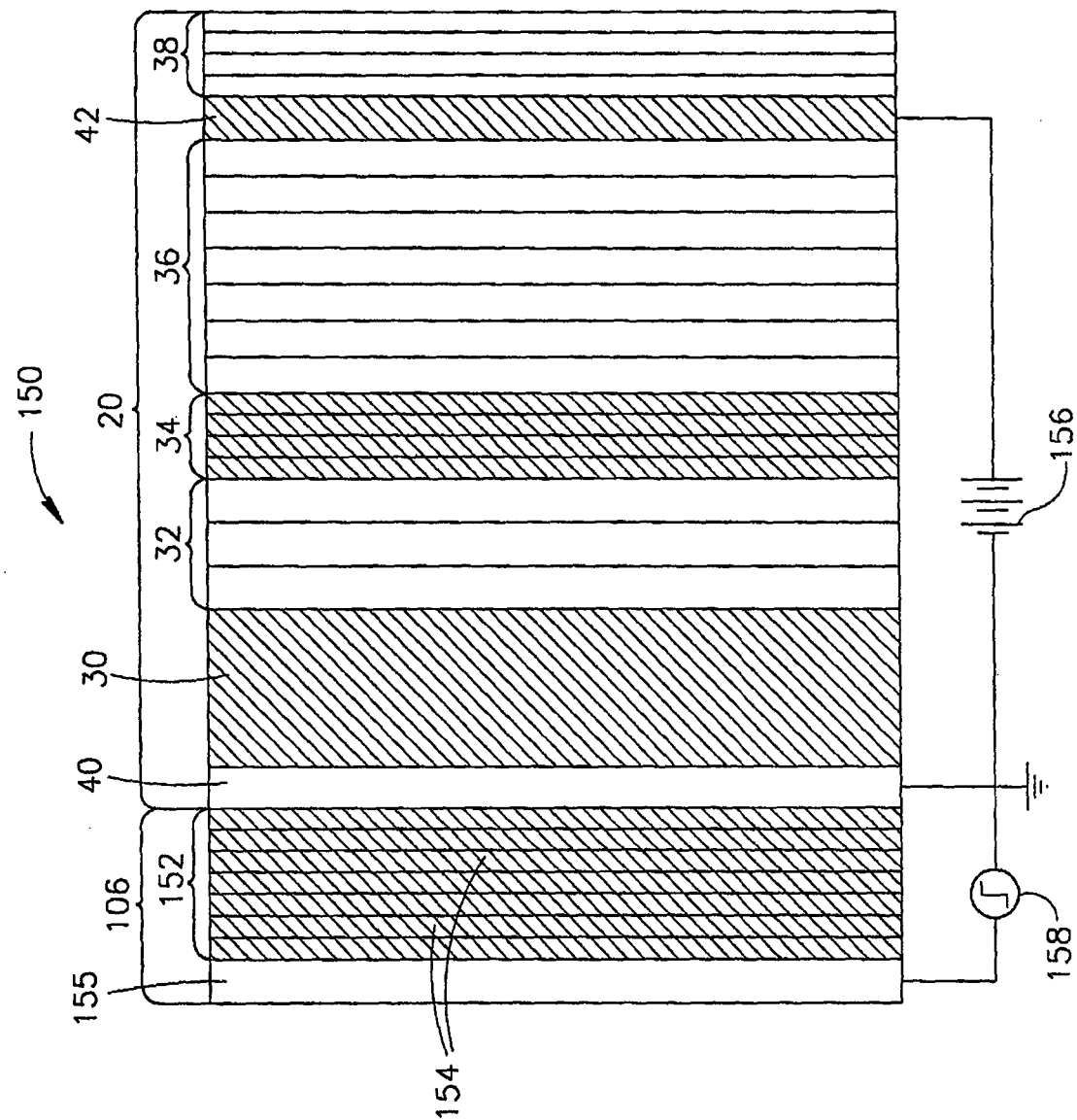
FIG. 5 schematically shows a wavelength converter comprising a shutter that shutters input light, in accordance with a preferred embodiment of the present invention.

FIG. 5 schematically shows a wavelength converter 150 comprising wavelength converter 20 integrated with shutter 106 to form a single optical element. Shutter 106 and wavelength converter 20 are grown together using methods known in the art. Preferably, shutter 106 is a shutter of a type described in PCT Publication WO 99/40478 referenced above, which comprises an epitaxial MQW structure 152 comprising alternating narrow and wide band-gap layers 154 grown on conducting layer 40 of wavelength converter 20. A conducting layer 155 is formed on the end of MQW structure 152 opposite conducting layer 40. Conducting layer 40 functions as a common electrode for wavelength converter 20 and shutter 106. A power supply 156 provides voltage for wavelength converter 20 while power supply 158 generates potential differences between layer 40 and layer 155 to control shutter 106.

Figure 6:
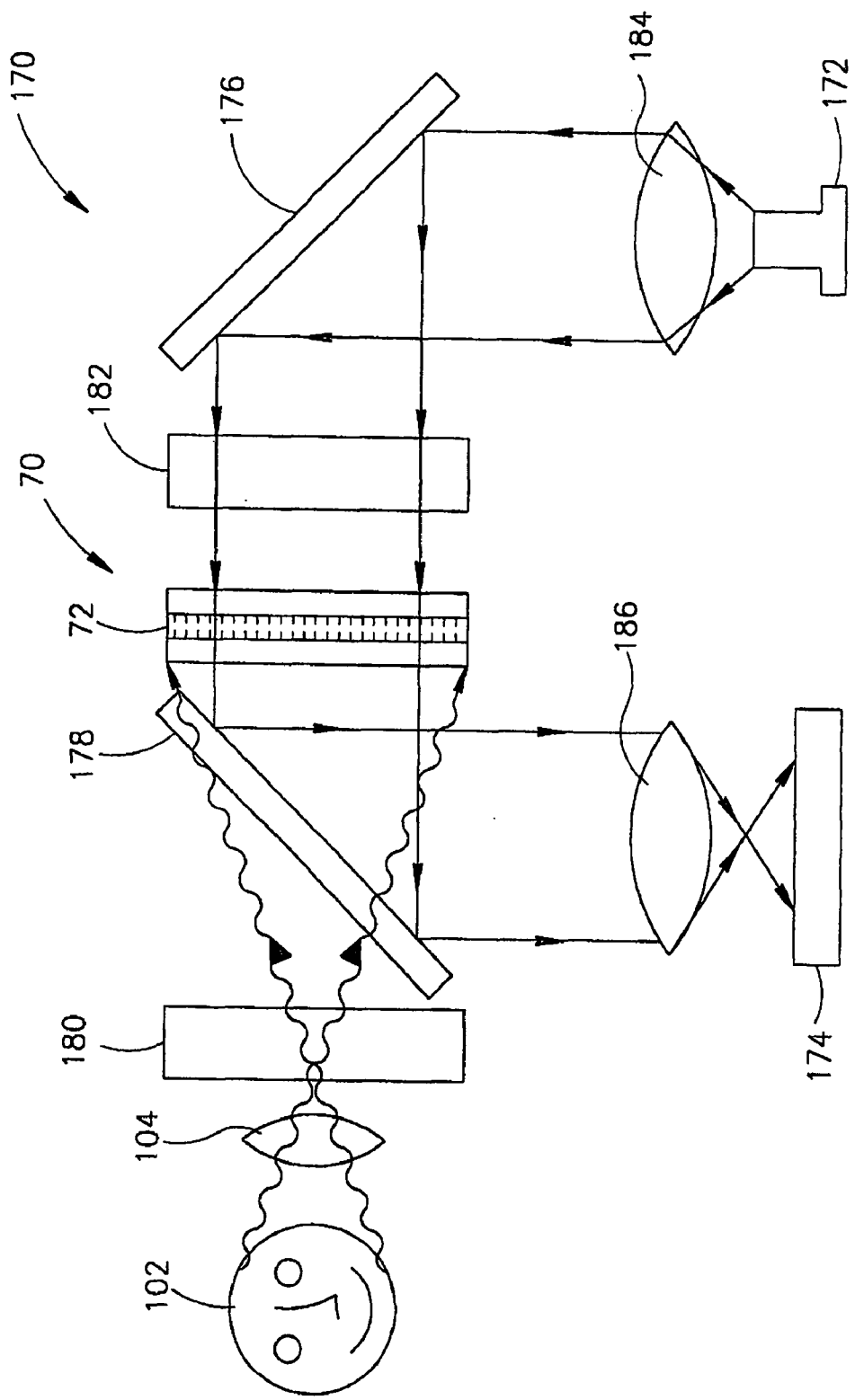
FIG. 6 schematically shows another camera comprising the wavelength converter, in accordance with a preferred embodiment of the present invention.

FIG. 6 schematically shows a camera 170 comprising wavelength converter 70 shown in FIG. 2, imaging an object 102, in accordance with a preferred embodiment of the present invention. In FIG. 6 only those features and elements of wavelength converter 70 that are required by the following discussion are shown. Whereas camera 170 is shown comprising a wavelength converter 70, camera 170 may also be used, in accordance with a preferred embodiment of the present invention, with wavelength converter 80 replacing wavelength converter 70.

Camera 170 comprises a source 172 of output light 22, a light sensitive surface 174, first and second mirrors 176 and 178 and preferably an input light shutter 180 and an output light shutter 182. Mirrors 176 and 178 are substantially transparent to input light and substantially totally reflecting for output light. Preferably, shutters 180 and 182 are large aperture shutters of a type described in PCT Publication WO 99/40478. A controller (not shown) controls shutters 180, 182 and light source 172.

In forming an image of object 102, the controller opens shutter 180 for an appropriate period of time and input light, represented by wavy arrowed lines 24, is collected by collecting optics 104. Collected input light 24 passes through input light shutter 180 and second mirror 178 to generate a charge image (represented by "trapped" minus signs) of object 102 in trapping layer 72 of wavelength converter 70.

After the charge image is formed, the controller controls light source 172 to radiate output light 22 which is collimated by a collimating lens 184 and directed so that it is incident on first mirror 176. First mirror 176 reflects output light 22 towards shutter 182. The controller controls shutter 182 to shape output light 22 into a pulse of light having a pulse length determined as described in the discussion of FIG. 2. The pulse of output light 22 passes through wavelength converter 70 and is incident on second mirror 178, which reflects the incident pulse of output light 22 to imaging optics 186. Imaging optics 186 images the pulse of output light 22 onto light sensitive surface 174.

Whereas in camera 170 a pulse of output light 22 is formed using shutter 182, in some preferred embodiments of the present invention, a pulse of output light 22 is formed by controlling power input to light source 172 using methods known in the art. Furthermore, as in the case of camera 100 shown in FIG. 4 camera 170, in accordance with some preferred embodiments of the present invention, comprises a source of light for illuminating object 102 with input light 24.

In addition, whereas in camera 170 wavelength converter 70 is shown separate from shutters 180 and 182, in some preferred embodiments of the present invention, wavelength converter 70 is integrally combined with one or both of shutters 180 and 182 in a single optical element. The method by which wavelength converter 70 is combined with one or both of shutters 180 and 182 to form a single optical element is similar to the method by which wavelength converter 20 is combined with shutter 106 as explained in the discussion of FIG. 5.

In some preferred embodiments of the present invention, camera 170 is operated as a gated 3D camera. Gated 3D cameras and the manner in which they operate are described in PCT Publications WO97/01111, WO97/01112, and WO97/01113, the disclosures of which are incorporated herein by reference.

In a gated 3D mode, camera 170 is operated in conjunction with a pulsed light source (not shown) to provide 3D images of a scene. The pulsed light source radiates a train of light pulses that illuminate the scene. Following a predetermined time delay after each light pulse in the train is radiated, shutter 180 gates camera 170 on and off. During the time that shutter 180 is gated on, camera 170 receives light from the light pulse that is reflected by reflecting surfaces in the scene. An amount of light from each light pulse that reaches camera 170 from a reflecting surface during the time that shutter 180 is open is a function of the distance of the reflecting surface from the camera. The reflected light that passes through shutter 180 is incident on wavelength converter 70 and generates an image charge of the scene in trapping layer 72. The density of electrons in a region of the image charge is a function of the distance to a reflecting surface imaged in the region of the image charge.

All the light pulses in the pulse train are preferably radiated in a time period substantially shorter than the relaxation time of trapping layer 72, (i.e. the time it takes trapped electrons to escape from trapping layer 72 and erase a charge image). As a result, after light from the last light pulse in the train of light pulses is collected, the total amount of trapped charge in layer 72 is the sum of trapped charges generated by reflected light from each of the light pulses in the train of light pulses. Trapping layer 72 accumulates, in effect integrates, electrons generated in photo-conducting layer 30 by light reflected from the light pulses by objects in the scene.

Following the collection of reflected light from the last light pulse in the train of light pulses, a pulse of output light 22 is radiated to pass through wavelength converter 70 and impinge on photosensitive surface 174. A next "illumination" cycle, comprising illuminating the scene with a train of light pulses and radiating an output light pulse 22, may be repeated following a delay, preferably equal to or greater than the relaxation time of trapping layer 72, after radiation of the output light pulse 22. Illumination cycles are repeated as many times as required to form an image of the scene on photosensitive surface 174. The amount of light used to provide the image is proportional to the product of the number of illumination cycles and the number of light pulses in a light pulse train that illuminates the scene in each cycle. The intensity of light in a region of the image is used to determine a distance to a reflecting surface in the scene that is imaged on the region. Methods by which distances are determined from the intensities of the image are described in the PCT Publications referenced above.

To illustrate the operation of camera 170 in a 3D mode, in accordance with a preferred embodiment of the present invention, assume that camera 170 is being used to provide 3D video images of object 102, and that object 102 is located between 6 m-9 m from camera 170. A suitable pulsed light source illuminates object 102 with a train of light pulses having by way of example, pulse widths equal to 10 nsec and a time delay between light pulses equal to 100 nsec. Following a time delay of preferably 40 nsec, after each light pulse in the pulse train is radiated, shutter 180 is gated open for preferably 10 nsec. (The 40 nsec time delay and the 10 nsec pulse width and gate width set the camera to measure distances from the camera in a range from 6 m-9 m. The 100 nsec spacing between light pulses provides sufficient time between light pulses so that when shutter 180 is open, reflected light from substantially only one light pulse reaches the shutter.)

Preferably, the number of light pulses in the light pulse train is such that the time duration of the train is substantially less than the relaxation time of trapping layer 72. For example, in a preferred embodiment of the present invention, the train of light pulses comprises 1000 light pulses. As a result, reflected light from all the light pulses in the train of light pulses is incident on wavelength converter 70 in a time period of 0.1 msec. This time period is sufficiently shorter that the 1 msec relaxation time of trapping layer 72 so that during this time period little of the trapped charge generated by the reflected light leaks away.

After illumination of object 102 with the train of light pulses, a pulse of output light 22 is radiated by laser 172 to pass through wavelength converter 70 and impinge on photosensitive surface 174. Following a 1 msec delay, a next train of light pulses from the pulsed light source is radiated to illuminate object 102 and begin the illumination cycle again. The illumination cycle is preferably repeated 30 times so that the total number of light pulses used to form a 3D-video image of object 102 is 30,000. Variations in pulse and gate widths, timing sequences and the number of pulses in a pulse train in the above described imaging scenario are possible in accordance with preferred embodiments of the present invention and can be advantageous, and such variations will occur to persons of the art.

Whereas in the above described preferred embodiment of the present invention a train of illuminating light pulses substantially shorter than the relaxation time of wavelength converter 70 is used, in other preferred embodiments of the present invention, object 102 is substantially continuously illuminated with light pulses 24. Trapped charge accumulation and leakage reach a steady state and pulses of output light 22 are transmitted continuously subject to avoiding saturation of wavelength converter 70 as described above.

It should be realized that while only camera 170 has been described operating in a 3D mode, camera 100 is similarly operated in a 3D mode.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

The present invention has been described using non-limiting detailed descriptions of preferred embodiments thereof that are provided by way of example and are not intended to limit the scope of the invention. The described preferred embodiments comprise different features, not all of which are required in all embodiments of the invention. Some embodiments of the present invention utilize only some of the features or possible combinations of the features. Variations of embodiments described and embodiments comprising different combinations of features noted in the described embodiments will occur to persons of the art. The scope of the invention is limited only by the following claims.

What is claimed:

1. A method for encoding information that is encoded in spatial variations of the intensity of light characterized by a first wavelength in light characterized by a second wavelength, the method comprising:
   transmitting the first wavelength light through a photo-conducting material in which electron-hole pairs are generated by absorbing photons from the first wavelength light to generate a first density distribution of electrons homologous with the spatial variations in intensity of the first wavelength light;
   trapping electrons from the first electron density distributions in a trapping region to generate an electric field homologous with the density distribution in a modulating material that modulates a characteristic of light that passes therethrough responsive to an electric field therein;
   transmitting a pulse of second wavelength light having sufficient energy to generate electron-hole pairs in the photo-conducting material through the modulating material and thereafter through the photo-conducting layer to generate a second additional electron density homologous with the first electron density distribution; and
   trapping electrons from the second electron density distribution in the trapping region;
   where the transmitting the pulse of second wavelength light through the modulating material modulates the pulse of second wavelength light in response to the electric field and encodes the pulse of second wavelength light with the information.

2. A method according to claim 1, further comprising passing electrons generated in the photo-conducting material through a structure comprising a plurality of graded-band-gap layers in which electrons are multiplied in an avalanche process, the structure is between the photo-conducting material and the trapping region.

3. A method according to claim 1 wherein a pulse length of the pulse of second wavelength light is long enough so that a portion of the pulse is in the modulating material after electrons generated responsive to the pulse of second wavelength light have been trapped and change the electric field in the modulating material.

4. A method according to claim 1 wherein the pulse of second wavelength light passes substantially completely through the modulating material before electrons generated in the photo-conducting layer by the pulse of second wavelength light are trapped and change the electric field in the modulating material.

5. A method according to claim 1 wherein generating the second additional electron density comprises:
   transmitting a pulse of second wavelength light through the modulating material after an electric field substantially homologous with the variations in intensity of the first wavelength light is established in the modulating material; and transmitting thereafter the pulse of light through the photo-conducting layer to generate the second density distribution of electrons.

6. A method according to claim 5 wherein the pulse length of the pulse is long enough so that a portion of the pulse is in the modulating material after electrons generated responsive to the pulse have been trapped and change the electric field in the modulating material.

7. A method according to claim 1 wherein the pulse of second wavelength light passes substantially completely through the modulating material before electrons generated in the photo-conducting layer by the pulse of second wavelength light are trapped and change the electric field in the modulating material.

8. A method according to claim 1, wherein generating a first and second electron density comprises generating a first and second electron density for each light pulse in a train of first wavelength light pulses, all of which have substantially the same spatial intensity variations, and trapping electrons comprises trapping electrons from densities generated for light pulses in the train of light pulses in a same trapping region.

9. A method according to claim 1 wherein generating a first and second electron density comprises generating a first and second electron density for each light pulse in a train of first wavelength light pulses, all of which have substantially the same spatial intensity variations, and trapping electrons comprises trapping electrons from densities generated for light pulses in the train of light pulses in a same trapping region.

10. A method according to claim 1 wherein a wavelength of the first wavelength light is longer than a characteristic wavelength of the second wavelength light.

11. A method according to claim 1 wherein a wavelength of first wavelength light is shorter than a characteristic wavelength of the second wavelength light.

12. A method according to claim 1 wherein a wavelength of the first wavelength light is substantially equal to a characteristic wavelength of the second wavelength light.

13. A method according to claim 1, wherein:
the first wavelength light is incident upon the photo-conducting material in a first direction; and
the pulse of second wavelength light is incident upon the modulating material in a second direction, opposite the first direction.

14. A method according to claim 13, wherein:
the pulse of second wavelength light is not reflected before reaching the photo-conducting layer.

15. A method according to claim 1, wherein:
before the pulse of second wavelength light is transmitted through the modulating material, the pulse of second wavelength light is transmitted through a reflector that reflects the first wavelength light.

16. A method according to claim 1, wherein:
the first wavelength light is transmitted through a conducting layer before the first wavelength light is transmitted through the photo-conducting material; and
the pulse of second wavelength light is transmitted through the conducting layer after the pulse of second wavelength light is transmitted through the photo-conducting material.

17. A method according to claim 1, wherein:
the modulating material provides a negative image modulation of the pulse of second wavelength light.

18. A method according to claim 1, wherein:
the pulse of second wavelength light is not reflected back through the modulator material.

19. A method according to claim 2, wherein:
the modulating material provides a negative image modulation of the pulse of second wavelength light; and
the pulse of second wavelength light has a duration t which is less than d/v, where d is a thickness of the structure and v is a drift velocity with which electrons move through the structure.

20. A method according to claim 2, wherein:
the modulating material provides a negative image modulation of the pulse of second wavelength light; and
the pulse of second wavelength light has a duration t which is less than $(d+\delta)/v$, where d is a thickness of the structure, v is a drift velocity with which electrons move through the structure, and $\delta$ is a depth, where modulation of the pulse of second wavelength light in the modulation field is not substantially modified by electrons generated by the pulse of second wavelength inside the photo-conducting material up to the depth $\delta$ inside the photo-conducting material.

21. An apparatus which performs the method of claim 1.

* * * * *